(12) United States Patent  
Kao

(10) Patent No.: US 9,915,408 B2  
(45) Date of Patent: Mar. 13, 2018

(54) LED LIGHTING FIXTURE

(71) Applicant: TEST RITE INTERNATIONAL COMPANY, LTD., Taipei (TW)

(72) Inventor: Edward Kao, Taipei (TW)

(73) Assignee: TEST RITE INTERNATIONAL COMPANY, LTD., Taipei (TW)

( * ) Notice: Subject to any disclaimer, the term of this patent is extended or adjusted under 35 U.S.C. 154(b) by 0 days.

(21) Appl. No.: 15/262,463

(22) Filed: Sep. 12, 2016

(65) Prior Publication Data

US 2017/0082260 A1 Mar. 23, 2017

(30) Foreign Application Priority Data

Sep. 18, 2015 (CN) ..................... 2015 2 0726313 U

(51) Int. Cl.
*F21L 4/00* (2006.01)
*F21L 13/00* (2006.01)
(Continued)

(52) U.S. Cl.
CPC ................ *F21V 3/02* (2013.01); *F21S 8/081* (2013.01); *F21S 9/037* (2013.01); *F21V 7/04* (2013.01); *F21V 23/003* (2013.01); *G02B 19/0014* (2013.01); *G02B 19/0042* (2013.01); *G02B 19/0061* (2013.01); *H05B 33/0845* (2013.01); *F21V 7/041* (2013.01); *F21W 2131/10* (2013.01); *F21Y 2105/12* (2016.08); *F21Y 2115/10* (2016.08); *Y02B 20/72* (2013.01)

(58) Field of Classification Search
CPC ...... F21S 9/03; F21S 4/26; F21S 9/037; F21S 8/081; B66F 11/04; F21V 33/00; F21V 3/02; F21V 23/003; F21V 7/04; F21V 7/041; F21Y 2115/10; F21Y 2105/12; H05B 33/0845; G02B 19/0061; G02B 19/0014; G02B 19/0042; F21W 2131/10; Y02B 20/72

USPC ... 362/183, 168, 184, 191, 247, 249.02, 431

See application file for complete search history.

(56) References Cited

U.S. PATENT DOCUMENTS 6,784,357 B1 * 8/2004 Wang ..................... F21S 8/086  
    136/244  
7,654,684 B1 * 2/2010 Wight .................... G09F 13/02  
    362/183

(Continued)

*Primary Examiner* — Elmito Breval  
*Assistant Examiner* — Glenn Zimmerman  
(74) *Attorney, Agent, or Firm* — Locke Lord LLP; Tim Tingkang Xia, Esq.

(57) ABSTRACT

The present invention provides an LED lighting fixture, comprising: a lens configured to concentrate light from a light source and project a concentrated light beam; an LED module comprising a controller and a plurality of LED lamps arranged in a geometric pattern, the controller being configured to control variation in luminous intensity of the plurality of LED lamps; a solar module configured to receive the concentrated light beam projected by the lens and convert the received light energy to electricity to actuate the LED module; and a lamp shade with an uneven surface; wherein the controller controls variation in luminous intensity of the plurality of LED lamps and causes light emitted from the plurality of LED lamps to be casted upon the uneven surface which, in collaboration with the geometric pattern of the plurality of LED lamps, creates a variety of lighting effects through refraction.

5 Claims, 4 Drawing Sheets

(51) Int. Cl.
   *F21V 3/02*     (2006.01)
   *F21S 8/08*     (2006.01)
   *F21S 9/03*     (2006.01)
   *F21V 7/04*     (2006.01)
   *F21V 23/00*    (2015.01)
   *G02B 19/00*    (2006.01)
   *H05B 33/08*    (2006.01)
   *F21Y 115/10*   (2016.01)
   *F21W 131/10*   (2006.01)
   *F21Y 105/12*   (2016.01)

(56) References Cited

U.S. PATENT DOCUMENTS

| | | | |
|---|---|---|---|
| 8,858,015 B2* | 10/2014 | Harshaw | F21S 9/037 |
| | | | 362/153.1 |
| 2003/0201874 A1* | 10/2003 | Wu | A01M 29/16 |
| | | | 340/384.2 |
| 2005/0248285 A1* | 11/2005 | Richmond | F21S 9/037 |
| | | | 315/149 |
| 2006/0007549 A1* | 1/2006 | Zincone | E04D 13/033 |
| | | | 359/591 |
| 2008/0013306 A1* | 1/2008 | Guilmette | G09F 13/02 |
| | | | 362/183 |
| 2012/0243213 A1* | 9/2012 | Chen | H05B 33/0809 |
| | | | 362/183 |
| 2013/0049609 A1* | 2/2013 | Browder | G09F 27/007 |
| | | | 315/159 |
| 2013/0208454 A1* | 8/2013 | Chen | F21S 9/035 |
| | | | 362/183 |
| 2014/0160738 A1* | 6/2014 | Rozot | F21S 2/005 |
| | | | 362/191 |
| 2014/0321106 A1* | 10/2014 | Workman | F21L 4/02 |
| | | | 362/183 |
| 2015/0338040 A1* | 11/2015 | Swope | F21S 8/083 |
| | | | 362/183 |
| 2016/0040841 A1* | 2/2016 | Martzall | F21V 23/04 |
| | | | 362/183 |

* cited by examiner

LED LIGHTING FIXTURE

CROSS-REFERENCE TO RELATED APPLICATION

This non-provisional application claims priority under 35 U.S.C. § 119(a) on Patent Application No. 201520726313.5 filed in P.R. China on Sep. 18, 2015 the entire contents of which are hereby incorporated by reference.

BACKGROUND

Technical Field

The present invention relates to an LED lighting fixture, and more particularly, to an LED lighting fixture utilizing a controller to control variation in luminous intensity of a plurality of LED lamps arranged in a geometric pattern and, in collaboration with an irregular or uneven surface of a lamp shade, creating a variety of lighting effects through refraction.

Description of Related Art

Solar powered LED lawn lights are generally of plain design and used for illumination only. For most of the lighting products, changes are made to their exteriors; however, monotonous lighting effects can no longer satisfy consumers' rapid changing tastes. Therefore, there is a need in the art for a landscape lighting fixture having aesthetically pleasing exterior design and satisfactory functionality, powered by green energy and applicable to a wide range of applications, including illumination and embellishment of lawns in parks, garden villas, green lands, sceneries, resorts, golf courses, green areas around factories and lawns in residential communities.

SUMMARY

An object of the present invention is to provide an LED lighting fixture utilizing a controller to control variation in luminous intensity of a plurality of LED lamps arranged in a geometric pattern and, in collaboration with an irregular or uneven surface of a lamp shade, creating a variety of lighting effects through refraction.

The present invention that accomplishes the above-mentioned object is an LED lighting fixture comprising:

a lens configured to concentrate light from a light source and project a concentrated light beam;

an LED module comprising a controller and a plurality of LED lamps arranged in a geometric pattern, the controller being configured to control variation in luminous intensity of the plurality of LED lamps;

a solar module configured to receive the concentrated light beam projected by the lens and convert the received light energy to electricity to actuate the LED module; and a lamp shade with an uneven surface;

wherein the controller controls variation in luminous intensity of the plurality of LED lamps and causes light emitted from the plurality of LED lamps to be casted upon the uneven surface which, in collaboration with the geometric pattern of the plurality of LED lamps, creates a variety of lighting effects through refraction.

Preferably, the LED lighting fixture of the present invention further comprises a hood, a housing, a light-reflecting tube, and a stand. The hood defines an opening at a top end thereof for receiving the lens; the housing comprises a cover defining an opening at a top end thereof for receiving the solar module and a main body comprising a cross bar at a bottom end thereof; the light-reflecting tube is disposed on the cross bar and secured to the stand through a locking member.

Preferably, both the hood and the cover are structurally tapered.

Preferably, both the housing and the lamp shade are made of transparent materials.

Preferably, the light-reflecting tube is made of a light-reflecting material.

Preferably, the controller is configured to control variation in luminous intensity and luminance distribution of the plurality of LED lamps.

Preferably, the geometric pattern in which the plurality of LED lamps are arranged can be any geometric pattern, such as a triangular pattern, a circular pattern, a linear pattern or a parallel alternating pattern, thereby enhancing the lighting effects.

Preferably, the surface of the lamp shade can have any pattern, such as a decorative pattern, a regular pattern or an irregular pattern, thereby creating a variety of lighting effects.

Compared with the prior art techniques, the LED lighting fixture of the present invention is advantageous in that it utilizes a controller to control variation in luminous intensity of a plurality of LED lamps arranged in a geometric pattern and, in collaboration with an irregular or uneven surface of a lamp shade, creates a variety of lighting effects through refraction, thereby illuminating the lawn and embellishing the landscape.

BRIEF DESCRIPTION OF THE DRAWINGS

The appended drawings are intended for purposes of illustration only and are not intended to limit the scope of the present invention.

DETAILED DESCRIPTION

The present invention will be fully described in the following exemplary embodiment by reference to the appended drawings so that the technical solution, object and effects of the present invention will be better understood.

Figure 1:
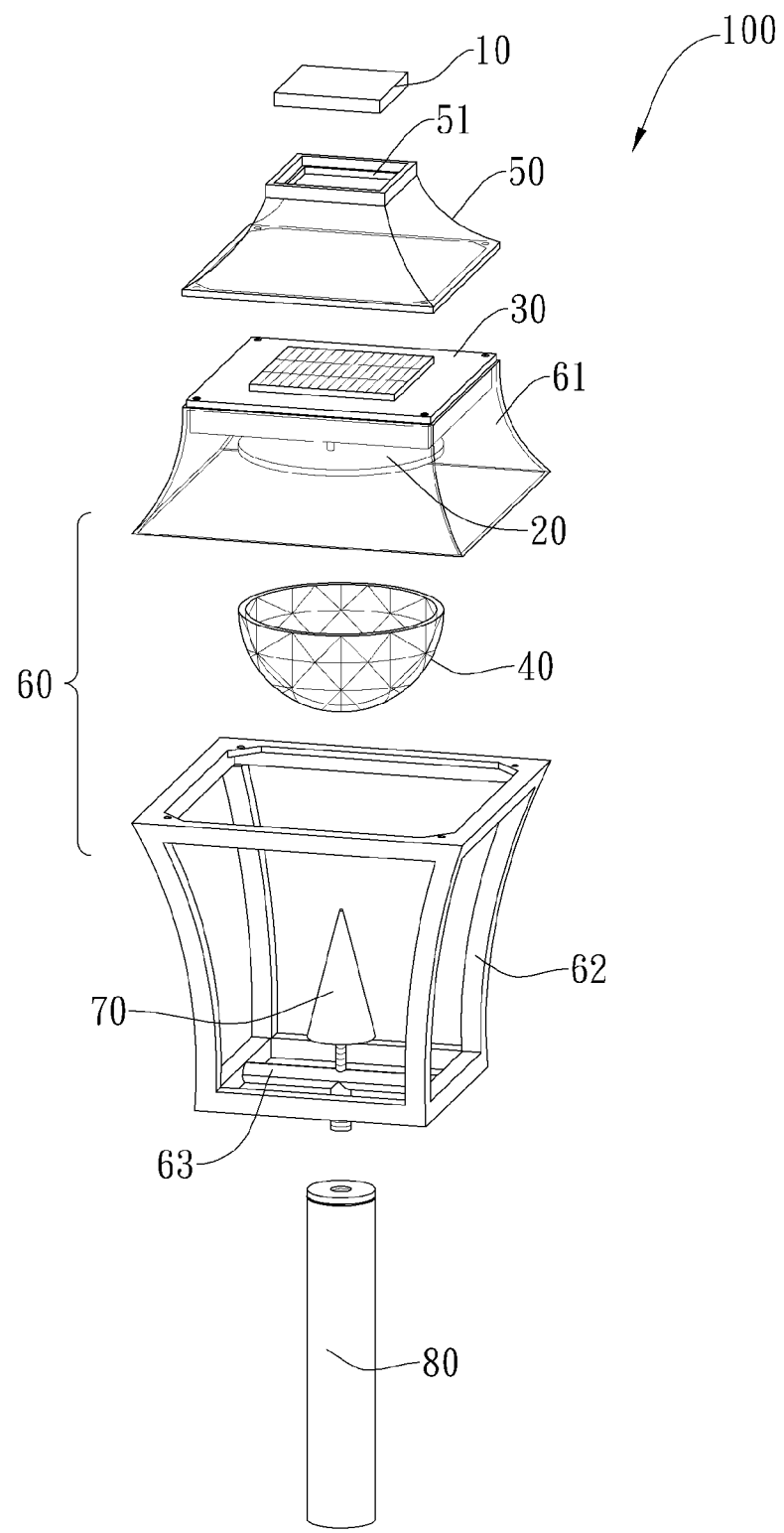
FIG. 1 is an exploded perspective view of an LED lighting fixture of the present invention.
Figure 2A:
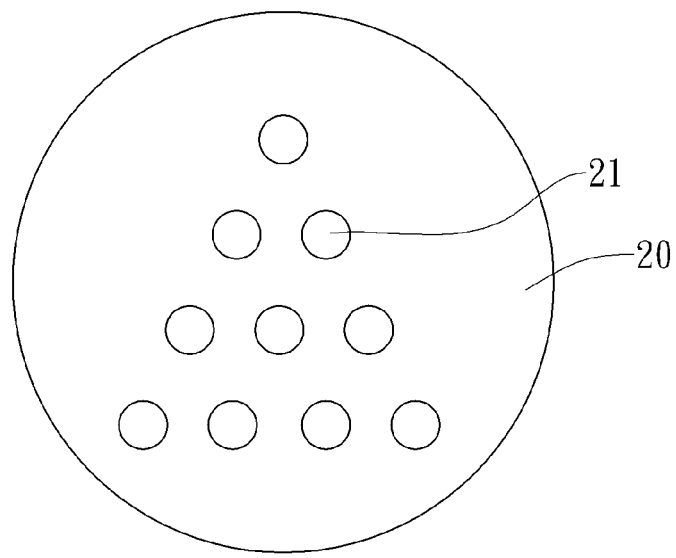
FIGS. 2A-2D are schematic views showing the exemplary geometric patterns in which the LED lamps of the LED lighting fixture of the present invention can be arranged.
Figure 2B:
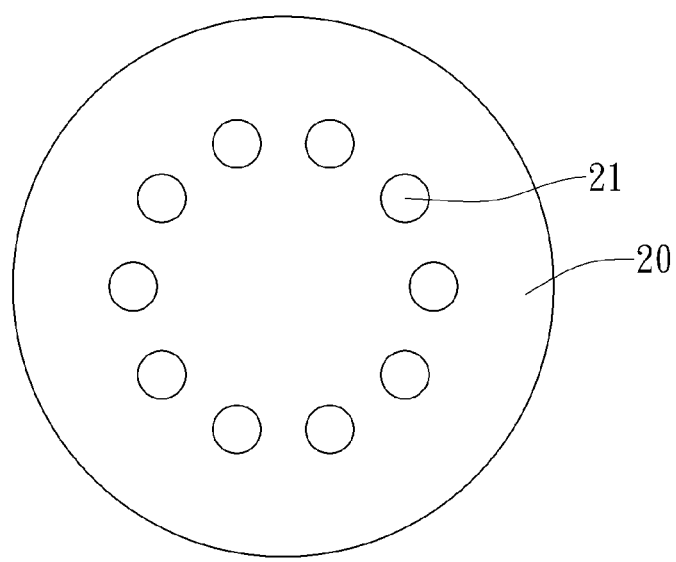
Figure 2C:
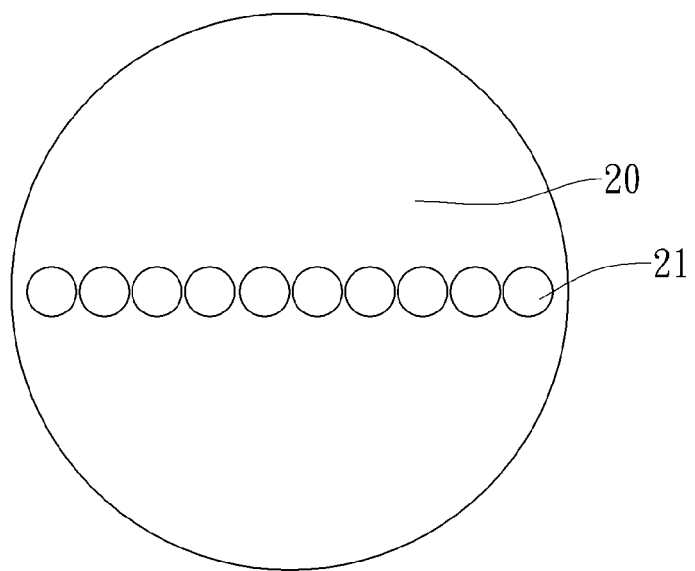
Figure 2D:
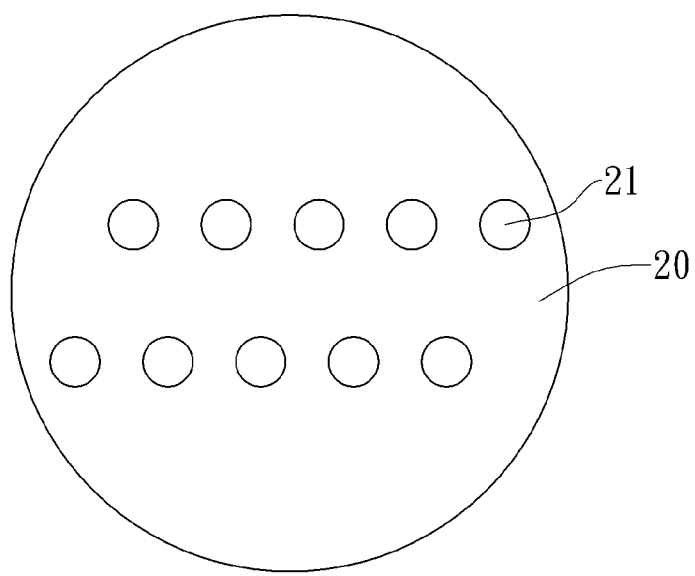

FIG. 1 is an exploded perspective view of an LED lighting fixture of the present invention. As shown in FIG. 1, there is provided an LED lighting fixture 100, comprising: a lens 10 configured to concentrate light from a light source and project a concentrated light beam; an LED module 20 comprising a controller (not shown) and a plurality of LED lamps (not shown) arranged in a geometric pattern, the controller being configured to control variation in luminous intensity of the plurality of LED lamps; a solar module 30 configured to receive the concentrated light beam projected by the lens 10 and convert the received light energy to electricity to actuate the LED module 20; and a lamp shade 40 with an uneven surface; wherein the controller controls variation in luminous intensity of the plurality of LED lamps and causes light emitted from the plurality of LED lamps to be casted upon the uneven surface which, in collaboration with the geometric pattern of the plurality of LED lamps, creates a variety of lighting effects through refraction.

Referring to FIG. 1, the LED lighting fixture 100 of the present invention further comprises a hood 50, a housing 60, a light-reflecting tube 70 and a stand 80. The hood 50 is structurally tapered and defines an opening 51 at a top end thereof for receiving the lens 10; the housing 60 comprises a cover 61, which is structurally tapered and defines an opening at a top end thereof for receiving the solar module 30, and a main body 62, which comprises a cross bar 63 at a bottom end thereof; the LED module 20 is disposed under and electrically connected to the solar module 30; the lamp shade 40 covers the LED module 20 and disposed within the main body 62; the light-reflecting tube 70 is disposed on the cross bar 63 of the main body 62.

In this embodiment, the controller is configured to control variation in luminous intensity and luminance distribution of the plurality of LED lamps. The geometric pattern in which the plurality of LED lamps are arranged can be any geometric pattern, such as a triangular pattern, a circular pattern, a linear pattern or a parallel alternating pattern, as shown in FIGS. 2A-2D, thereby enhancing the lighting effects. Moreover, the surface of the lamp shade 40 can have any pattern, such as a decorative pattern, a regular pattern or an irregular pattern, thereby creating a variety of lighting effects. In addition, in this embodiment, both the housing 60 and the lamp shade 40 are made of transparent materials, and the light-reflecting tube 70 is made of a light-reflecting material, thus the light emitted from the plurality of LED lamps 21 can be reflected in a direction toward the lamp shade 40. Consequently, the LED lighting fixture 100 of the present invention has a wider range of illumination.

Figure 3:
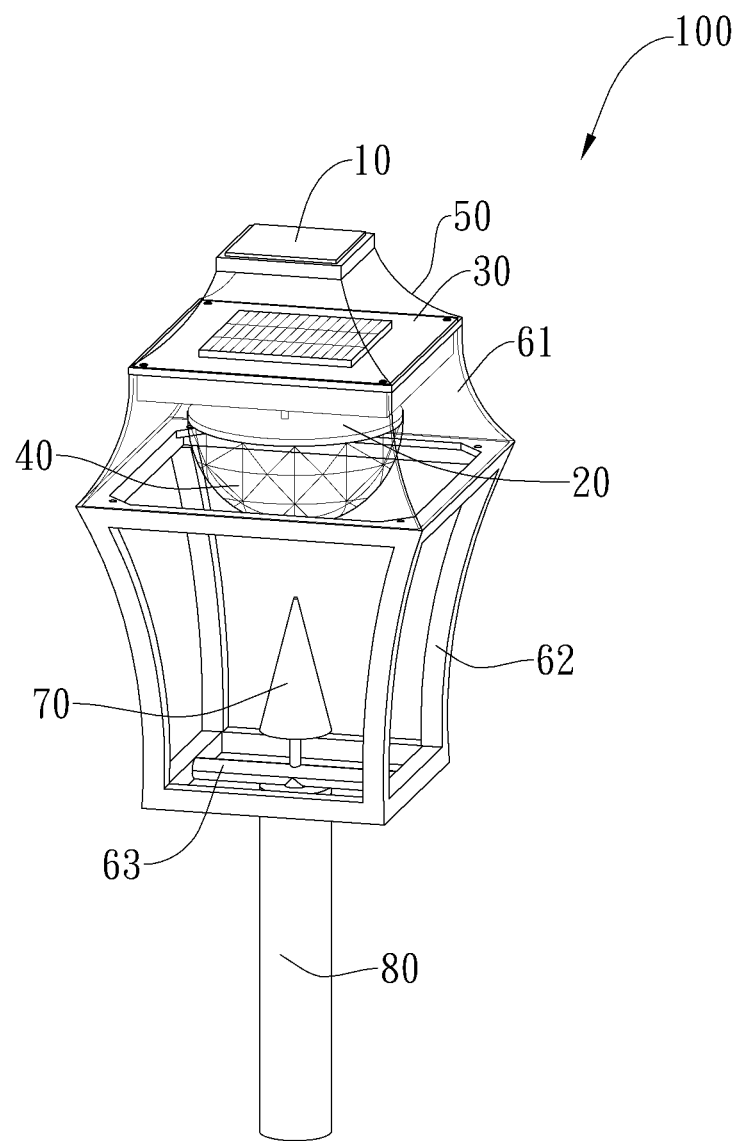
FIG. 3 is a perspective assembly view of the LED lighting fixture of the present invention.

Please refer to FIG. 1 and FIG. 3, a perspective assembly view of the LED lighting fixture of the present invention. The lens 10 is placed on and secured to the opening 51 of the hood 50, and the solar module 30 is secured to the opening of the cover 61. The other end of the hood 50 opposite to the opening 51 is engaged with the solar module 30 through a securing member (not shown) such that the hood 50 is disposed above the cover 61 and the LED module 20 is disposed under and electrically connected to the solar module 30. The lamp shade 40 covers the LED module 20 such that the lamp shade 40 is in a downward orientation. The cover 61 is engaged with the main body 62 such that the LED module 20 and the lamp shade 40 are disposed within the housing 60. In addition, the light-reflecting tube 70 is disposed on the cross bar 63 of the main body 62 and secured to the stand 80 through a locking member (not shown), thereby accomplishing the assembly of the LED lighting fixture 100.

The LED lighting fixture of the present invention utilizes a controller to control variation in luminous intensity of a plurality of LED lamps arranged in a geometric pattern and, in collaboration with an irregular or uneven surface of a lamp shade, creates a variety of lighting effects through refraction, thereby illuminating the lawn and embellishing the landscape.

The embodiment described above is exemplary and not intended to limit the scope of the present invention. It is to be noted that those skilled in the art can make a number of changes and modifications without departing from the spirit of the present invention, and that such changes and modifications shall be within the scope of protection of the present invention.

What is claimed is:

1. An LED lighting fixture, characterized in comprising:
   a lens configured to concentrate light from a light source and project a concentrated light beam;
   an LED module comprising a controller and a plurality of LED lamps arranged in a geometric pattern, the controller being configured to control variation in luminous intensity of the plurality of LED lamps;
   a solar module configured to receive the concentrated light beam projected by the lens and convert the received light energy to electricity to actuate the LED module;
   a lamp shade with an uneven surface and the light emitted from the plurality of LED lamps to be casted upon the uneven surface which, in collaboration with the geometric pattern of the plurality of LED lamps, creates a variety of lighting effects through refraction;
   a hood defining an opening at a top end thereof for receiving the lens;
   a housing comprising:
      a cover defining an opening at a top end thereof for receiving the solar module; and
      a main body comprising a cross bar at a bottom end thereof;
   a light-reflecting tube; and
   a stand;
   wherein the light-reflecting tube is disposed on the cross bar and secured to the stand via a locking member.

2. The LED lighting fixture according to claim 1, characterized in that both the hood and the cover are structurally tapered.

3. The LED lighting fixture according to claim 1, characterized in that both the housing and the lamp shade are made of transparent materials.

4. The LED lighting fixture according to claim 1, characterized in that the light-reflecting tube is made of a light-reflecting material.

5. The LED lighting fixture according to claim 1, characterized in that the geometric pattern in which the plurality of LED lamps are arranged is a triangular pattern, a circular pattern or a linear pattern.

* * * * *